United States Patent [19]

Jaeger et al.

[11] 3,963,468
[45] June 15, 1976

[54] LIGHT GUIDE FABRICATION

[75] Inventors: Raymond Edward Jaeger, Basking Ridge; John Burnette MacChesney, Stirling; Douglas Arthur Pinnow, Warren; LeGrand Gerard Van Uitert, Morris Township, Morris County, all of N.J.

[73] Assignee: Bell Telephone Laboratories, Incorporated, Murray Hill, N.J.

[22] Filed: Feb. 15, 1974

[21] Appl. No.: 442,747

[52] U.S. Cl. ............................ 65/3 A; 65/30 R; 65/32; 65/DIG. 7
[51] Int. Cl.² ................ C03C 25/02; C03C 15/00
[58] Field of Search .......... 65/30, 32, DIG. 7, 30 E, 65/30 R

[56] References Cited
UNITED STATES PATENTS

| | | |
|---|---|---|
| 3,650,598 | 3/1972 | Kitano et al. .......................... 65/30 |
| 3,778,132 | 12/1973 | Pinnow et al. ................... 65/DIG. 7 |
| 3,817,731 | 6/1974 | Yoshiyagawa ......................... 65/32 |
| 3,843,228 | 10/1974 | Yoshiyagawa et al. ............. 65/30 R |

*Primary Examiner*—S. Leon Bashore
*Assistant Examiner*—Frank W. Miga
*Attorney, Agent, or Firm*—G. S. Indig

[57] ABSTRACT

A light guide is produced by the out-diffusion of boron oxide through a free surface of a uniform borosilicate mass. The resulting structure consists of increased index silica rich regions near the surface in contact with lower index regions of a composition approaching that of the unmodified borosilicate. The out-diffusion process, generally carried out at a temperature approaching the softening point of the glass, may be applied to a borosilicate tube to result in a fiber preform. Fibers drawn from such a preform may be characterized by a silica core region, a borosilicate clad region, and a silica outer shell. Use of the procedure results in a graded index structure.

14 Claims, 4 Drawing Figures

LIGHT GUIDE FABRICATION

BACKGROUND OF THE INVENTION

1. Field of the Invention

The invention is concerned with light guides for use in the visible and near visible spectra. Guides of the invention may take the form of any of a variety of configurations: as portions of planar integrated circuits, or transmission lines of generally round configuration. Light guiding in such structures is principally within regions of refractive index higher than that of surrounding regions.

2. Description of the Prior Art

Continuing developments in optical communications give rise to the expectation of commercial use in the near future. Doubtless, a major use of optical communications is inspired by the broad bandwidth capability inherent in the use of the higher carrier frequencies represented by the visible and near visible spectra.

It is likely that systems introduced will, for this reason, involve channels of bandwidths of a megahertz or greater. For example, one such system might involve transmission of video information and might make use of analog bandwidth possibly equal to the 4 megahertz bandwidth of commercial U.S. television (or of an equivalent bit rate).

Other systems under study, while taking advantage of broad bandwidth capability, involve transmission of many multiplexed channels. Such a system now under study may involve transmission of hundreds of voice channels on cables interconnecting telephone central offices.

Other uses take advantage of particular characteristics of available transmission media and may not benefit directly from broad bandwidth capability. Examples are systems designed to operate in hardened radiation sites, as well as those subject to other types of interference, such as aboard aircraft, etc.

While a number of transmission media are under study, glass lines now appear to be of particular promise for many purposes. One such line is constructed of a glass which, for guiding purposes, is clad with a different glass composition of lesser refractive index. Glass lines at an advanced state of development are generally silica base. Since silica has a relatively low index as among glasses otherwise suitable for this purpose, an approach is to accomplish the desired core-to-clad index variation by doping the core, for example, with titania to increase its index.

An alternative form of clad glass line utilizes a pure silica core which is clad with a borosilicate composition which is found to manifest the desired lowered index. Prospectively, this type of line has certain advantages due to its constant homogeneous core composition. It is only necessary to avoid mechanical defects to assure a virtual absence of scattering centers.

Borosilicate clad silica lines described, for example, in *Appl. Phys. Letters*, vol. 23, pp. 340–341, Sept. 15, 1973, have been under study for some time and the variety of fabrication techniques have been considered. Generally, fabrication contemplates a preform of two or more layers and controlled fiber drawing from such a preform. Preforms have been prepared by a variety of techniques, inter alia, deposition of a borosilicate composition on the outer surface of a silica rod, deposition of the layer of, first, a borosilicate layer and, finally, a silica layer inside a silica tube, as well as a variation of this last procedure in accordance with which a silica rod is inserted after deposition of the borosilicate layer. The last two procedures offer certain structural advantages of value both during processing and in use. The presence of the outer silica layer with its relatively high melting point permits higher temperature processing during fiber drawing (borosilicate compositions of interest are of significantly lower melting point and are easily distorted during drawing), and differences in temperature coefficient of expansion are less likely to result in damage due to temperature change where the borosilicate "clad" is sandwiched between regions of the same coefficient.

The fact that light energy, like other electromagnetic wave energy, when launched in lines of appropriate cross section results in propagation of a variety of modes traveling at different velocities., has given rise to two types of line configurations designed to minimize dispersion due to this effect. The first of these contemplates a core dimension sufficiently small as to support only a first order mode. Such "single mode lines" are perhaps an ultimate solution. Practical problems, such as poor coupling efficiency, particularly with large solid angle oscillators, splicing, etc., have prompted an alternative approach. The graded index line desirably manifesting an approximately parobolically decreasing index from core center in an outward radial parabolically is of larger effective core diameter and so overcomes some of the problems associated with the single mode line. The index gradient is a continuous focusing influence and by providing relatively long path length for faster moving, higher order modes tends to minimize mode dispersion. See, for example, 9, *Applied Optics*, 753 (1970).

Graded index structures have been made by ion exchange and have also been approximated by deposition of successive layers of core materials of differing index values. Difficulties encountered in fabrications of this desired structure include strains due to compositional variation, and, generally, difficulty of profile control.

An allied field, that of integrated optics, may also depend upon light guiding regions defined within a film, usually a planar film, of lowered index. Graded index guiding regions may be desirable in planar structures, as well as in transmission lines.

SUMMARY OF THE INVENTION

In accordance with the invention, graded refractive index guides are produced in borosilicate glass by out-diffusion. Such out-diffusion, which results in glass regions, depleted with respect to boron, is accomplished at elevated temperature sometimes as accelerated by the presence of an ambient constituent which reacts with or otherwise getters boron-containing material which migrates to a free surface. In general, out-diffusion is carried out at temperatures approaching the softening point (or glass transition temperature) although, if supporting structure is present, temperatures approaching the liquidous temperature may be utilized. Ambient agents which may accelerate the process and thereby permit operation at lower temperature include water, alcohol, ammonia, etc.

As applied to the fabrication of graded index structure transmission lines, out-diffusion may proceed from the inner surface of a borosilicate preform of tubular cross section. In accordance with one embodiment of the invention, out diffusion proceeds simultaneously both from inner and outer surfaces of such a tubular preform with the result that the drawn fiber is characterized by three layers: a silica rich core section, a borosilicate clad—perhaps of unmodified composition— and, finally, an outer jacket, again, silica rich. Alternatively, a rod of core material may be inserted in the treated tube prior to pulling to result in a similar configuration. This structure, it will be recognized, closely resembles supported structures produced by more complex means in accordance with prior art teachings.

The out-diffusion procedure of the invention may be applied also to the fabrication of integrated optics. Borosilicate layers—generally supported layers— may be out-diffused generally in selected regions to result in light guides. Selectivity is generally accomplished by masking means, such as an overlaying patterned film so chosen as to be generally impervious to out diffusing boron-containing material and/or to penetration by reactant gaseous material in the ambient.

Consistent with conventional usage, the invention is discussed in terms of "optics" or "light". It is well known that such systems contemplate use of near visible radiation—particularly infrared radiation—and the inventive teaching embraces energy of such type so as to include the entire wavelength range which is expediently transmitted through silica. For long distance transmission purposes, this wavelength range may be considered as extending from 0.6 micrometer ($\mu$m) to 2.5 $\mu$m; while for integrated optics where insertion loss is of less concern, the range may be considered as extending from 0.3 $\mu$m to 3.5 $\mu$m.

It is an attribute of the out-diffusion process in accordance with the invention that the resulting index profile approximate a parabolic profile. For relatively shallow out-diffusion distances, the resulting profile is very close to that of a complementary error function. The relationship of such a profile to one of parabolic grading is depicted in the drawing and is discussed in the Detailed Description.

While the invention is certainly based on the out-diffusion mechanism described, fabrication of the end product may well entail subsequent processing steps. Fabrication of round clad transmission lines, for example, involves fiber drawing. These and other processing steps are described to the extent necessary for expository purposes. In certain instances, they are included in claims directed to preferred embodiments.

DETAILED DESCRIPTION

1. The Drawing

Figure 1:
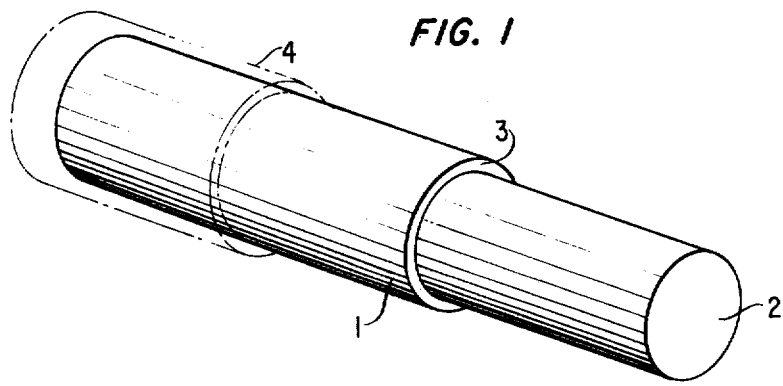
FIG. 1 is a perspective view of a section of a transmission line structure in accordance with the invention.

FIG. 1 depicts a portion of an optical transmission line 1 including a core member 2, a clad 3, and optionally, a support member 4. While so schematically represented, it is the nature of the inventive process that the final structure is not stepped abruptly from a core composition 2 to a clad composition 3, but rather that it is graded as described. For these purposes, core member 2 may be considered as corresponding with that central region over which the total variation in index is less than 0.001. The high index value of the central core region may be as high as 1.470 representing the index for 0.589 $\mu$m wavelength light and corresponding with Al, Ge, or Na modified silica or 1.4585, the value for pure fused SiO$_2$. The minimum value of index within the clad region 3 is that of the borosilicate composition containing the largest boron level in the structure subsequent to processing. This value may be as low as 1.448 (a value as measured for light of a wavelength of 0.589 $\mu$m) and corresponding with a composition of 60 percent by weight silica remainder boron oxide. The core region for these purposes is defined so that region over which the index variation ($\Delta\eta$) varies from $\eta$ max. (the value at the center of the core) to $\eta$ max. $-$ 0.001. Optional outer support member 4, shown in phantom, is representative of that structure resulting from an embodiment in which out-diffusion proceeds simultaneously from the inner and outer surfaces of a borosilicate tubular preform. The index range of such optional member may be considered as corresponding with that of the core. Where pure fused SiO$_2$ constitutes the core, extreme values of refractive index $\eta$, as measured for light of a wavelength of 0.589 $\mu$m in vacuum, are 1.459 (pure silica) and $\sim$1.448 (60 percent by weight silica, remainder B$_2$O$_3$).

Figure 2:
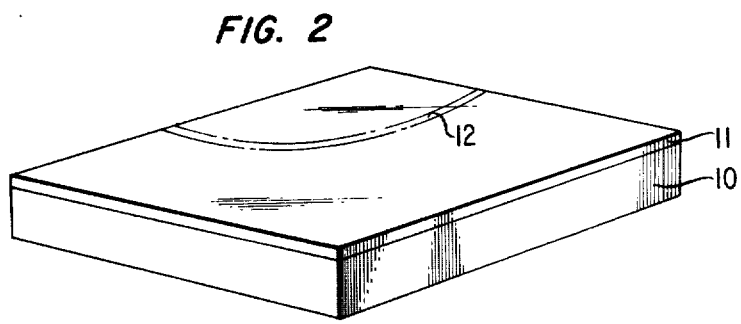
FIG. 2 is a perspective view of a section of an integrated optic circuit prepared in accordance with the invention.

FIG. 2 depicts a substrate 10 supporting a borosilicate layer 11 within which a guide region 12 has been defined by selective out-diffusion of boron-containing material so leaving a region enriched with respect to silica.

Figure 3:
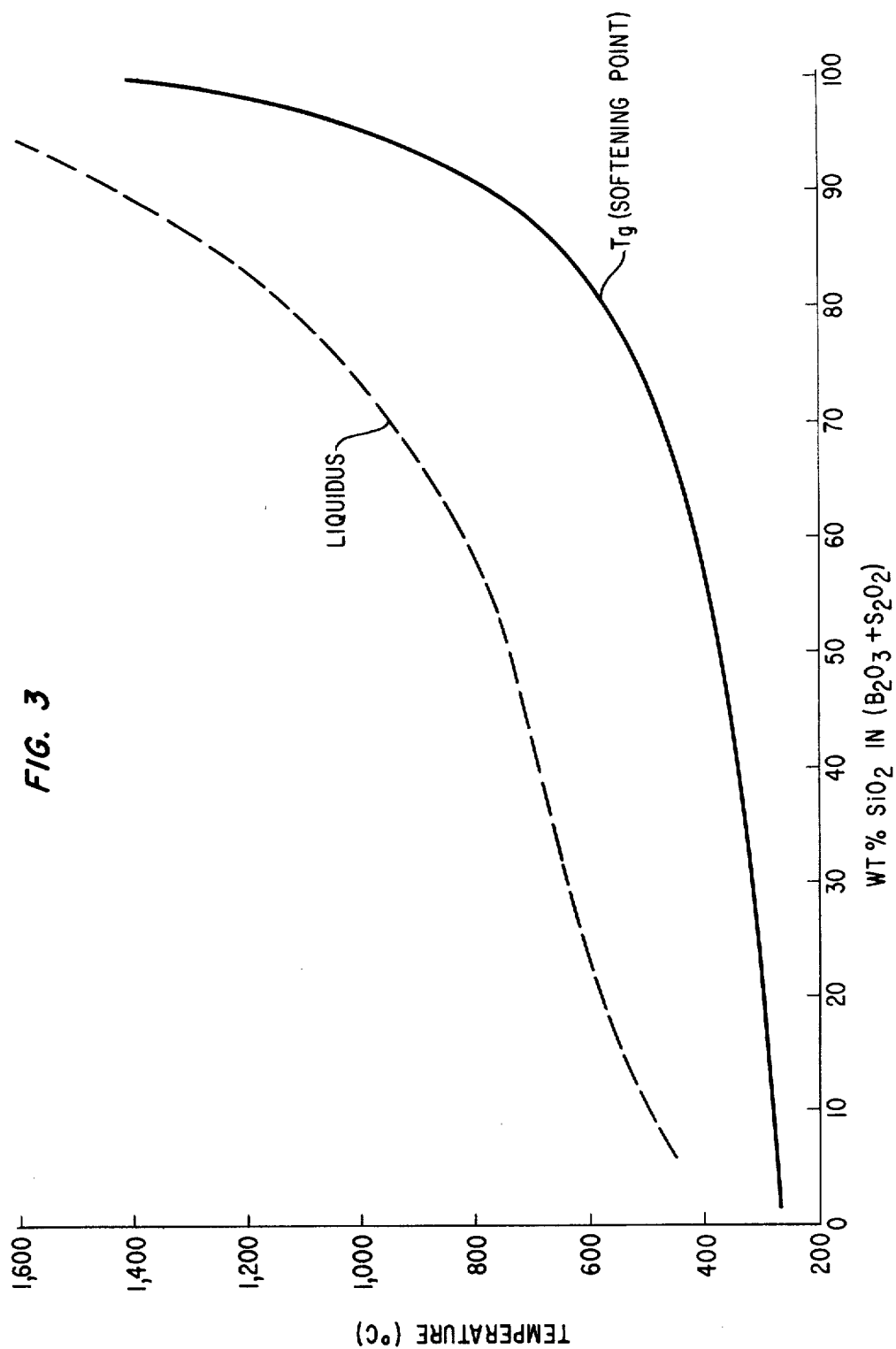
FIG. 3, on coordinates of temperature on the ordinate and weight percent silica on the abscissa, is a plot showing glass transition temperature (or softening temperature) and liquidous temperature of borosilicate glasses of varying silica content.

FIG. 3 presents data useful in defining an appropriate processing schedule in accordance with the invention. It contains a liquidous curve and a softening point curve (corresponding with glass transition $T_g$), both relative to weight percent SiO$_2$ in the total glassy composition considered as consisting of a mixture of B$_2$O$_3$ and SiO$_2$. Absolute values are shifted somewhat for compositions additionally containing Ge or other index-increasing dopant.

Figure 4:
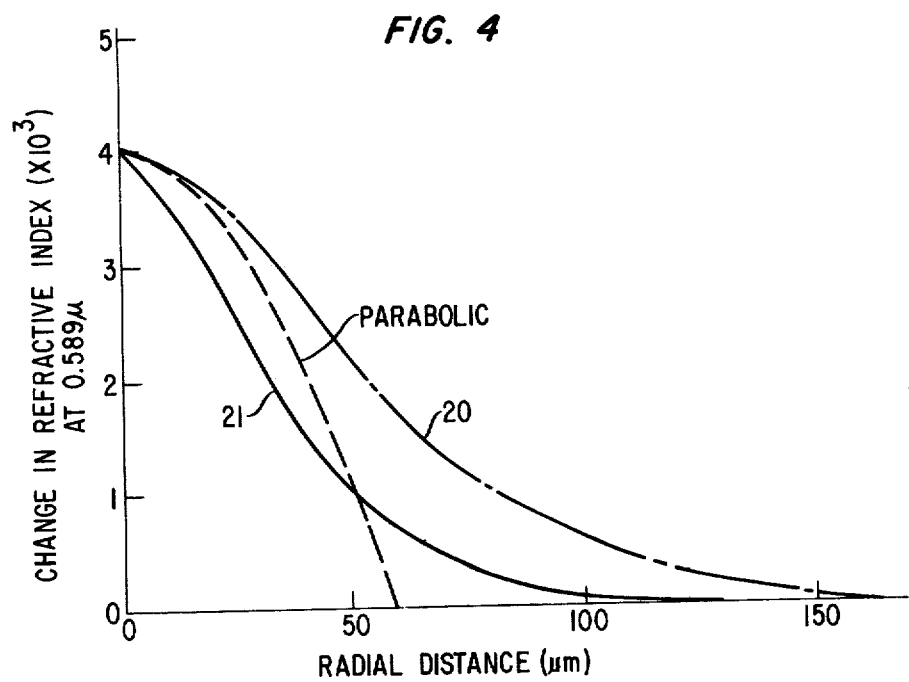
FIG. 4, on coordinates of change in refractive index, show $\Delta\eta$ as measured at 0.589 $\mu$m in the radial direction in a guide produced in accordance with the invention.

FIG. 4 represents index gradients produced in accordance with particular processing schedules. For reference, a parabolic profile with values initially lying between those of curves 20 and 21 is depicted. The procedures of curves 20 and 21 are discussed in detail as examples 1 and 2. Briefly, curve 20 is for water treatment for 24 hours at 1,000°C; while curve 21 is for methanol treatment for 24 hours at 630°C. Initial tubing composition contained about 80 percent silica, remainder B$_2$O$_3$. Out-diffusion in both instances was carried out under conditions such as to result in substantially complete B$_2$O$_3$ depletion at the inner-most portion of the annular cross section of the tube.

2. Processing

The inventive procedures are described in terms of a transmission line preform which is considered to constitute the preferred embodiment. In discussing parameters suitable for this purpose, temperature ranges, atmospheres, times, and other relevant parameter ranges are set forth. In discussing all such ranges, there is indication of the depth and degree of $B_2O_3$ removal. All such parameters are selected in accordance with desired profile and dimensions. Described conditions are, therefore, generally applicable to structures other than the usual circular transmission lines. Where guides are to be defined in planar bodies, whether supported or not, it is sometimes necessary to mask regions which are to remain unaffected. Suitable masking materials include chromium, tungsten, and pyrolytic carbon. All such materials present a diffusion barrier to gaseous elements included to accelerate out-diffusion. Following creation of guides in such planar geometries, barrier regions may, if desired, be removed, for example, by oxidation or by use of suitable reagents.

The invention is specific to the use of boron-containing glassy compositions. The remainder of all such compositions is generally silica, although some modification is possible. Detailed discussion of compositional requirements is set forth under Section 3 of this Detailed Description. The essence of the invention involves removal of boron-containing material to define a region having a refractive index greater than that of the unmodified glass. In consequence, any permitted modification must not defeat this essential requirement—i.e., removal of boron-containing material (enrichment with respect to silica) must result in an increase in refractive index for portions of the spectrum of concern. Glass compositions of the invention are generally oxidic so that contained boron may be assumed to be in the oxide form $B_2O_3$. In this discussion, it will be assumed that the diffusing species is, indeed, $B_2O_3$, even though it is known that any such out diffusing species may react at a free surface to produce a different—generally volatile—species.

In general, the significant portion of the starting "body" (supported or unsupported) is of a uniform borosilicate composition. Out-diffusion from such a uniform composition results in the near-theoretical gradients illustrated by curves 20 and 21 of FIG. 4. While gradients are generally produced in nominally homogeneous material, useful results may be produced in material of deliberately nonuniform composition. So, for example, deposition techniques from a source material of varying composition may produce a starting gradient which is modified in accordance with the inventive out-diffusion processes. In this manner, closer approximation to a true parabolic profile may be attained, if desired. Specially tailored profiles deviating both from parabolic and complementary error function to accomplish particular guiding characteristics may also be closely approximated. See, for example, *Proceedings of the IEEE*, vol. 61, pp. 1703–1726, December 1973. Further, variation in profile may result from changing conditions during processing. Change in total pressure and of partial pressure, either of a reactive ambient or of volatile boron-containing species, are examples.

Since processing depends upon diffusion and since diffusion rate increases with temperature, it is generally desirable to operate at the highest temperature otherwise permitted. The maximum must be sufficiently low to avoid significant distortion. For unsupported structures, for example, tubular borosilicate preforms, the maximum temperature is simply the softening point of the glass. This temperature, sometimes designated by the symbol $T_g$ (glass transition temperature), is for convenience depicted as the lower curve on FIG. 3. For supported structures, for example, of planar geometry, temperature chosen for operation of the out-diffusion process may also depend on the nature of the ambient. An advantage of reactive ambient materials is the feasibility of operating at temperatures at or below 600°C where thermal volatilization of $B_2O_3$ is negligible. Certain of the more reactive ambient materials, however, impose an additional limitation. So, for example, methanol and other of the lower alcohols may decompose at lower temperatures; for example, methanol decomposes to carbon and hydrogen at a significant rate at temperatures of 700°C and above. Where higher temperatures are permitted, it is feasible to use less reactive ambients such as $H_2O$, $D_2O$ or $O_2$ or nonreactive ambients, such as argon or even nitrogen.

The initial effect of out-diffusion is to remove substantially the entirety of $B_2O_3$ so as to result in an essentially pure silica surface. Continuing the out-diffusion changes the depth but not the form of the profile. Aside from economic considerations, time and temperature are to be chosen to accomplish the desired depth. For most purposes contemplated by the invention, it is desirable that the gradient extend for a distance of at least 1 micron as determined by an index change of at least 0.001 in the pulled fiber or quenched substrate. The depth to which this variation is produced is, for these purposes, considered to define the gradient dimension.

FIG. 4 illustrates the variation in index of two preforms. Curve 20 depicts a gradient which resulted from treatment of a borosilicate glass having a $SiO_2/B_2O_3$ ratio of 4:1 for 24 hours at 1,000°C with water vapor carried by a stream of $N_2$, and curve 21 depicts the gradient resulting from methanol treatment, again for a 24 hour period, this time at a temperature of about 630°C. The total diameter of the tubular preforms used for developing the data of FIG. 4 was I.D. = 5 mm and O.D. = 6 mm in a 6 mm I.D. × 8 mm O.D. tube. The unaffected starting composition, therefore, defined a low index region spanning about ½ mm of the radial dimension. Drawing a half meter length of such a preform by a ratio of about 2000:1 permits preparation of a length of approximately 1 km of a structure resembling that of FIG. 1 and having an outer dimension of approximately 110 μm.

Both curves 20 and 21 are reasonable approximations of the parabolic form which is shown in phantom. The actual mathematical form of curves 20 and 21 can be predicted on the basis of well-known diffusion theory which in been applied extensively to doping of semiconductor devices. The experimental results have been fitted to the simple one-dimensional Fick diffusion equation (see S. M. Sze, *Physics of Semiconductor Devices*, John Wiley & Sons, (1969) pp. 80–83) which is expected to govern the out-diffusion profile for planar samples or for ccylindrical samples if the diffusion depth is small in comparison with the inner radius of the cylinder. The solution of the diffusion equation with the appropriate boundary conditions for out-diffusion of $B_2O_3$ from uniform borosilicate predicts that the change in r refractive index, $\Delta \eta$, is:

$$\Delta \eta (x,t) = \Delta \eta_o \, \text{erfc} \left( \frac{x}{2\sqrt{Dt}} \right)$$

where $\Delta \eta_o$ is the initial difference in refractive index between that of the initially uniform borosilicate glass and that of pure fused silica, $x$ is the distance from the free surface, $t$ is the time during which out-diffusion takes place, and D is the applicable diffusion coefficient. The experimental results fit well to this theoretical form making it possible to determine the magnitude of the diffusion coefficient for the various experimental conditions. For example, the value of the diffusion coefficient for curve 21 is $D = 2.4 \times 10^{-10}$ cm$^2$/sec.

For practical reasons, a lower temperature for treatment is about 300°C. High $B_2O_3$ glasses (more than about 50 weight percent) that show an adequate diffusion rate for boron at lower temperatures tend to be easily attacked by moisture.

Use of alcohols and amines is limited by decomposition temperature. Use of methanol, for example, results in some carbon deposition above about 700°C. To some extent this carbon can be removed by periodically flushing with $O_2$. Ammonia decomposition in the temperature range above about 700°C is also undesirable but the products of decomposition ($H_2$ and $N_2$) are volatile as are the borozoles formed with the boron available at the tube surface. The problem is therefore one of pollution. Generally $H_2O$ or $D_2O$ is recommended above about 700°C.

Where desired, the less stable volatilization agents can be used at low temperatures intermittently and $O_2$ and/or $D_2O$ circulated at high temperatures between treatments to oxidize deposits, hasten diffusion of boron to the surface, and/or exchange $OD^-$ for $OH^-$ in the glass.

High boron content materials may be treated at low temperatures (due to a low $T_g$), for example, with $CH_3OD$. However, low boron content materials, for which $T_g$ may be well above 1,000°C, generally require the use of more stable agents such as $D_2O$ in order to permit commercially expedient diffusion rates.

Volatile carboxylic acids, such as $CH_3COOH$, perform adequately in the lower temperature region. Halogen acids, such as HCl, should be used in moderation as they tend to remove Si as well as B from the exposed surfaces.

3. Composition

Starting compositions are basically $B_2O_3$-modified fused silica. The useful range based on the mole fraction $SiO_2/B_2O_3$ is from 30:1 to 1:1 with a preferred range from 8:1 to 2:1. Higher ratios do not yield high $\Delta \eta$ values while lower ratios result in compositions susceptible to moisture attack.

The general shape of the relevant refractive index—composition relationship—is unaffected by the amounts of index-increasing constituent added. Therefore, the same considerations apply for compositions including compounds of germanium, titanium, phosphorous and aluminum e.g. alumina, germanium oxide, or other index-increasing constituent; e.g., the effect of one weight percent $Al_2O_3$ addition is to increase the index by approximately 0.1 percent over the entire broad range of $SiO_2/B_2O_3$ specified.

Unintentional impurity content is, in general, kept at a very low level. Both silica and boron trioxide are available or may be purified to levels of the order of 99.9999 percent based on weight, and this purity level is desirable with respect to total rare earth and transition metal content. Other impurities such as Li, Na, Y and K, may be tolerated in higher amounts. From the standpoint of scattering impurities o refractive index, varying by more than 35 percent from that of $SiO_2$ should be kept to less than 0.2 percent by weight.

Insertion loss of a transmission line of the type under discussion is, in its limit, due to absorption and scattering components of the same order of magnitude. At 1.06 micrometers, the absorption component of the insertion loss for $SiO_2$ may be below 1 dB per kilometer. Impurities showing absorption at a wavelength of concern preferably should be kept at or below a level sufficient to contribute an approximately equal loss. Maintenance of total transition metal ion impurities below the indicated level of $10^{-5}$ percent by weight is generally sufficient for this purpose at 1.06 μm.

It is well known that a typical loss characteristic in the infrared is due to a harmonic of the fundamental $OH^-$ absorption. In the near infrared, the third harmonic absorption centers about 0.95 μm wavelength as measured in vacuum. Assuming operation at a wavelength near 1.06 μm, $OH^-$ level content of 0.2 percent by weight is considered a maximum permissible level. A value of extinction coefficient of 20 cm$^{-1}$ at 2.8 μm corresponds with this level. For the present process, the removal of any residual $OH^-$ in the core region of the preform is facilitated by using $D_2O$, $CH_3OD$ and similar deuterated gases or vapors to carry out boron as $H^+$ and $D^+$ will tend to exchange at high temperatures. Residual $OD^-$ is not deleterious, as the harmonics for $OD^-$ are remote from 1.06 μm.

4. Material Preparation

Glassy material may be prepared by any of several techniques. A conventional procedure for the preparation of optical quality silica glass is, for example, set forth in 5, *Journal of Non-Crystalline Solids*, 123–175, North-Holland Publishing Company (November 1970).

A test procedure found acceptable for the preparation of bulk material involves coprecipitating $B_2O_3$ and $SiO_2$ and treating the hydrous oxides to remove $H_2O$, or milling the oxides together overnight in a plastic jar using plastic-coated spinners. The pretreated material is loaded into platinum crucibles and heated at a temperature of 1350°C for several hours to bring about at least partial fusion. Fused material are then again heated, this time within a range of 1500° to 2,000°C, depending on $SiO_2$ content, in an iridium crucible. Cooling to room temperature is conveniently achieved by turning off the power to the melt furnace. The effective cooling rate in the equipment utilized is about 50°C/min. Test samples are then cut out of the solidified fused mass and are polished to suitable dimensions for preform fabrication or measurement.

An alternative procedure of preform fabrication utilizes the general techniques described in D. B. Keck et al, U.S. Pat. No. 3,711,262 issued Jan. 16, 1973. In accordance with this procedure, clad and/or core may be prepared by chemical vapor deposition (CVD) by use of silane-diborane-oxygen mixtures sometimes containing index-increasing material, as, for example, $GeH_4$. Such precursor material usually diluted with an inert gas, such as nitrogen or argon, is passed over a heated surface upon which deposition is to proceed.

Deposition may be on a solid core or within a hollow tube. In the present case, after depositing and fusing borosilicate inside a fused $SiO_2$ liner, the prepared tube is heated to or above $T_g$ for the borosilicate and is treated with any of the noted gaseous material for various periods of time to deplete boron content.

To form a fiber, the processed preform assembly is supported in a fixture attached to a feed mechanism, is provided with a source of heat sufficient to soften the glasses, and is drawn. Examples of heat sources include resistance furnaces, gas torches, noble gas plasmas, lasers and image focusing devices.

EXAMPLE 1

$SiO_2$ and $B_2O_3$, in a 4 to 1 ratio, were milled together overnight in a plastic jar using plastic-coated spinners. The mixed powders were sintered at 800°C in air overnight and were then fused together at ~2000°C for ~24 hours. The fusion was carried out in an iridium crucible that was heated by well known r.f. techniques under an atmosphere of argon and nitrogen to protect the crucible. The melt was then cooled to the softening point of the glass, near 1000°C, and the glass was drawn to form a rod (~1 cm diameter in this case). Alternatively, the glass could readily be drawn or extruded through a mold to form a tube. In this instance, however, the rod was core drilled (leaving a 0.5 cm hole) and polished to form a tube. The refractive index was approximately constant across the tube at this stage. The prepared tube was placed in a furnace and heated to ~650°C for 24 hours while $N_2$ bubbled through methanol was passed through it. Upon re-examination the prepared tube was found to be greatly depleted in $B_2O_3$ content at the surfaces exposed to the methanol. The change is readily seen in index of refraction variations observed on cut and polished cross-sections after quenching the tube from a high temperature. The index variations were determined by observing 50 mil slices from this tube in a transmission interference microscope. The slices which were polished flat were viewed in a direction parallel to the tube axis and the refractive index variations caused by the depletion of $B_2O_3$ showed up as measurable changes in the optical thickness (i.e., the product of physical thickness and refractive index) of the sample. Variations observed for a reference tube subjected to the same treatment, save for bubbling the $N_2$ through methanol, were negligible in comparison. The index of refraction across the tube after collapse of after-drawing to form fibers was of a useful GRIN type. The index variation across the preform is shown in FIG. 4, where it is compared with a true parabolic variation.

EXAMPLE 2

$SiO_2$ and $B_2O_3$ were coprecipitated by hydrolysis from a mixture of tetraethylsilicate and boric acid in water. The starting ratio of $SiO_2$ to $B_2O_3$ was 3:1. However, the product was closer to 4:1 due to the greater solubility of $B_2O_3$. The precipitated powder, while in slurry form, was spray dried by injection into an oven held at ~600°C and containing a helium atmosphere. The resulting powder was transferred to a fusion pot and melted together near 1900°C for ~20 hours. Care was taken to keep a helium cover to avoid entrapment of gases that do not easily diffuse in the molten glass. This procedure takes advantage of the relative ease of diffusion of He through glass. The resulting melt was drawn and tubes prepared as in Example 1. Tubes were treated with methanol and with $NH_3$ at ~600°C for ~48 hours with results comparable to those described in Example 1.

EXAMPLE 3

Fused quartz tubing having an O.D. of 1 cm, an I.D. of ¾ cm, and for selected purity and uniformity, was employed as a jacket for depositing layers of borosilicate. Using stainless steel and plastic piping, a mixture of silane and diborane carried by argon was passed through a millipore filter and reacted with oxygen inside the fused quartz tube at ~1200°C. The gas mixture was 4 $SiH_4$ to 1 $B_2H_6$; however, the deposit was ~6 $SiO_2$ to 1 $B_2O_3$ due to the greater volatility of $B_2O_3$. After a lining of ~300 $\mu$ m was deposited, the tube was treated with a stream of $N_2$ bubbled through $D_2O$ for 3 hours. Since diffusion is relatively fast at this temperature, not only was volatilization of boron effected but exchange of $OD^-$ for $OH^-$ residuals in the glass was extensive as shown by absorption loss measurements at 2.7 $\mu$ m (for $OH^-$) and 3.8 $\mu$ m (for $OD^-$). The tube was then partially collapsed on a glass lathe while flowing helium through the tube. Fibers pulled from the resulting preform showed a favorable GRIN structure and low $OH^-$ absorption. In comparison, blanks run in parallel showed only a minor loss of boron due to surface volatilization during collapse and drawing at the 2000°C required for working fused $SiO_2$.

EXAMPLE 4

Borosilicate was deposited in a fused $SiO_2$ tube as described in Example 3. However, a 2 part $SiCl_4$ – 1 part $BCl_3$ gas mixture was used. After the lining was treated with $D_2O$ vapors, a fused $SiO_2$ rod was inserted. Fibers pulled from the assembly showed a favorable GRIN interface between rod and tube as well as low $OH^-$ absorption.

What is claimed is:

1. Process for fabricating a light guide which as fabricated comprises a body including a core region and a clad region, the refractive index being graded from a first value within the core region to a lesser value within the clad region in which the variation in refractive index is due to an increasing content of boron oxide, said increasing content corresponding in direction with decreasing refractive index, in which both core region and clad region are constituted of glass comprising heat treating a body consisting essentially of a borosilicate glass composition, said composition having a ratio of $SiO_2$ concentration to $B_2O_3$ concentration in the range between 1:1 and 30:1, within the temperature range of from 100°C below the softening point of the said borosilicate glass composition to the softening point of the said borosilicate glass composition so as to result in out-diffusion of boron oxide from the said borosilicate glass thereby producing (1) a core region of lesser boron oxide content than that of the corresponding region of the said borosilicate glass before processing, and (2) a clad region which is of a composition more nearly that of the corresponding region of the said borosilicate glass before processing in which the said body before processing includes 2 borosilicate surfaces and in which out-diffusion is smultaneously from the two surfaces.

2. Process of claim 1 in which the two said surfaces are the inner and outer surface of a tubular body so that out-diffusion results in increasing index of refraction corresponding to decreasing boron content at each of the two said surfaces.

3. Process for fabricating a light guide which as fabricated comprises a body including a core region and a clad region, the refractive index being graded from a first value within the core region to a lesser value within the clad region in which the variation in refractive index is due to an increasing content of boron oxide, said increasing content corresponding in direction with decreasing refractive index, in which both core region and clad region are constituted of glass comprising heat treating a body consisting essentially of a borosilicate glass composition, said composition having a ratio of $SiO_2$ concentration to $B_2O_3$ concentration in the range between 1:1 and 30:1, within the temperature range of from 100°C below the softening point of the said borosilicate glass composition to the softening point of the said borosilicate glass composition so as to result in out-diffusion of boron oxide from the said borosilicate glass thereby producing (1) a core region of lesser boron oxide content than that of the corresponding region of the said borosilicate glass before processing, and (2) a clad region which is of a composition more nearly that of the corresponding region of the said borosilicate glass before processing in which the said body before processing includes a layer of borosilicate glass supported on a substrate, said layer having a free surface.

4. Process of claim 3 in which regions of the free surface of the supported layer are masked so as to lessen out-diffusion in masked regions, thereby defining a pattern in the said glass which manifests index of refraction greater than that of the masked regions.

5. Process for fabricating a light guide which as fabricated comprises a body including a core region and a clad region, the refractive index being graded from a first value within the core region to a lesser value within the clad region in which the variation in refractive index is due to an increasing content of boron oxide, said increasing content corresponding in direction with decreasing refractive index, in which both core region and clad region are constituted of glass comprising heat treating a body consisting essentially of a borosilicate glass composition within the temperature range of from 100°C below the softening point of the said borosilicate glass composition to the softening point of the said borosilicate glass composition so as to result in out-diffusion of boron oxide from the said borosilicate glass thereby producing (1) a core region of lesser boron oxide content than that of the corresponding region of the said borosilicate glass before processing, and (2) a clad region which is of a composition more nearly that of the corresponding region of the said borosilicate glass before processing said composition before processing having a ratio of $SiO_2$ concentration to $B_2O_3$ concentration in the range between 1:1 and 30:1 in which the said borosilicate glass is in the form of a tubular body before processing and in which a silica-base glass rod of index greater than that of the said inner surface of the said tube after processing is inserted within the tubular body.

6. Process of claim 2 in which the tubular body is collapsed subsequent to out-diffusion.

7. Process of claim 6 in which the borosilicate glass while at an elevated temperature is exposed to a gaseous ambient which favors out-diffusion of boron oxide.

8. Process of claim 7 in which the said ambient comprises a flowing stream.

9. Process of claim 8 in which out-diffusion is favored by reaction between at least a component of the said gas with the said glass to produce a volatile boron-containing compound.

10. Process of claim 9 in which the said component comprises an agent selected from the group consisting of water, ammonia, alcohols, amines, and deuterated equivalents.

11. Process of claim 10 in which the said component consists essentially of an agent selected from the group consisting of $H_2O$ and $D_2O$ and in which the said elevated temperature is at least 700°C.

12. Process of claim 11 in which the said elevated temperature is at least 1,000°C.

13. Process of claim 6 in which the said borosilicate glass contains at least one additional ingredient which increases index of refraction.

14. Process of claim 13 in which said ingredient is selected from the group consisting of compounds of germanium, titanium, phosphorous and aluminum.

* * * * *

UNITED STATES PATENT AND TRADEMARK OFFICE
CERTIFICATE OF CORRECTION

PATENT NO. : 3,963,468
DATED : June 15, 1976
INVENTOR(S) : Raymond E. Jaeger, John B. MacChesney,
             Douglas A. Pinnow, LeGrand G. Van Uitert It is certified that error appears in the above-identified patent and that said Letters Patent are hereby corrected as shown below:

Column 2, line 27, delete "paraboli-" and substitute therefor --direction--; line 28, delete "cally"; line 60, delete "Ambient" and substitute therefor --Gaseous ambient--; line 62, before "etc." insert --deuterated equivalents--. Column 6, line 68, change "inr" to --in--. Column 7, line 35, after "oxidize" insert --carbon--. Column 8, line 6, change "o" to --of--. Column 10, line 7, delete "for", after "selected" insert --for--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*